Jan. 13, 1925.

A. A. CLOKEY 1,522,865

SIGNALING SYSTEM

Filed Nov. 29, 1921   2 Sheets-Sheet 1

Inventor:
Allison A. Clokey
by Jul CR Roemer
Atty.

Jan. 13, 1925.

A. A. CLOKEY 1,522,865

SIGNALING SYSTEM

Filed Nov. 29, 1921   2 Sheets-Sheet 2

Inventor:
Allison A. Clokey.
by Jul C.R. Poemer
Atty.

Patented Jan. 13, 1925.

1,522,865

UNITED STATES PATENT OFFICE.

ALLISON A. CLOKEY, OF RUTHERFORD, NEW JERSEY, ASSIGNOR TO WESTERN ELECTRIC COMPANY, INCORPORATED, OF NEW YORK, N. Y., A CORPORATION OF NEW YORK.

SIGNALING SYSTEM.

Application filed November 29, 1921. Serial No. 518,571.

*To all whom it may concern:*

Be it known that I, ALLISON ANDREW CLOKEY, a citizen of the United States, residing at Rutherford, in the county of Bergen, State of New Jersey, have invented certain new and useful Improvements in Signaling Systems, of which the following is a full, clear, concise, and exact description.

This invention relates to telegraph systems and apparatus.

An object of the invention is the provision of synchronously operated means for relaying or repeating signal current impulses from one circuit to another.

In operating telegraph apparatus by reversals of current over long transmission lines, the signaling currents are so reduced in strength and distorted or altered in wave form by the transmitting medium that with the customary voltages applied, perfect reception at high speeds is difficult. An arrangement for minimizing the effects of such distortion and loss of energy and which has been used successfully for a number of years on land lines and short submarine telegraph cables both in connection with manually operated systems and multiplex printing telegraph systems, is known as the Gulstad vibrating relay. As ordinarily used, this type of relay consists of a polarized relay provided with three windings, which are termed line windings, opposing windings, and accelerating windings. The two latter windings are included in a vibrating circuit comprising a battery, the relay tongue and contacts and adjustable condenser and resistances. In practice, by adjustment of the resistances and condenser in the vibrating circuit, the relay tongue is caused to vibrate at a slightly greater frequency than the dot frequency transmitted from the distant station.

To obtain the best possible results with a relay of the type previously referred to, it is necessary that the frequency of vibrations exactly correspond to the frequency of the signals transmitted from the distant station, and that the wave form of the vibrating current nearly coincide with the wave form of the received signals, but owing to the effects of temperature, extraneous disturbances and those resulting from imperfect balancing of the duplex bridge, it is difficult to obtain such a condition. It is, therefore, to overcome these difficulties that the present invention is particularly adapted, although its use under other circumstances may be found advantageous.

Broadly considered, the invention contemplates a telegraph system employing an electro-responsive device, such as a relay, so constructed and arranged that the frequency of its vibration is automatically maintained in synchronism with the transmitting and receiving mechanisms. Specifically, the present invention contemplates the provision of a vibrating relay arrangement in which the frequency of vibration thereof is under the control of the receiving distributor, which in turn, as in standard multiplex printing telegraph systems, is automatically maintained in synchronism with the transmitting distributor.

Figure 1:
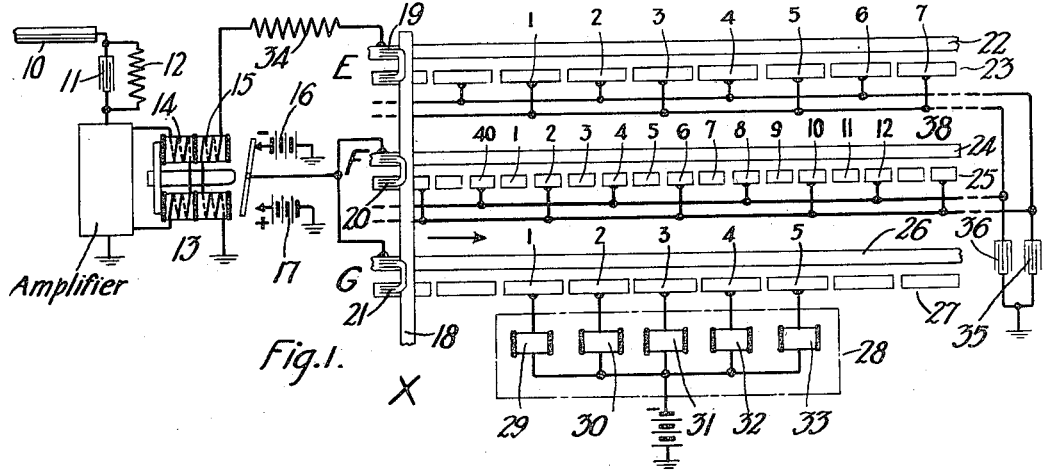
Fig. 1 illustrates an arrangement representing one embodiment of the invention.

In Fig. 1 a cable 10 extending from a distant station and terminating at station X is shown connected in series with a receiving condenser 11 shunted by a resistance 12 or other form of distortion correcting network and the input circuit of a vacuum tube or other type of amplifier. To the output circuit of the amplifier there is connected the main or holding winding 14 of a vibrating relay 13. A vibrating winding 15 has one terminal connected to ground, while the other terminal is connected with the continuous ring 22 of a rotary receiving distributor 38.

The receiving distributor 38, which for the sake of clearness has been shown developed, comprises three sections; E, F, and G, each of which consists of a continuous ring and a second ring divided into segments which are adapted to be bridged by a brush individual to each section. Each of the brushes 19, 20 and 21 is secured to an arm 18, arranged to be continuously rotated by means of a motor (not shown). Ring 23 forming a part of the section E has the even numbered segments thereof connected together and to the group of segments 2, 6, 10, etc. of ring 25 in section F, and the two groups are in turn connected to one terminal of a condenser 35, which has its other terminal connected to ground. The odd numbered segments of ring 23 are connected together, and to the group of segments 4, 8, 12, etc. of ring 25 which are connected to a condenser 36, which like condenser 35, has one terminal grounded. The segments of ring 27 are connected to the selecting magnets of a receiving printer diagrammatically represented by the rectangle 28.

The operation of the arrangement shown in Fig. 1 is as follows:

When no current is flowing through the main or holding winding 14 of the vibrating relay 13, the passage of the brush 20 over the segment 40 causes condenser 36 to be negatively charged over a circuit extending from battery 16, armature of relay 13, ring 24, brush 20, segment 40 to the terminal of the condenser 36. As this same brush begins to pass over segment 1, the charging circuit for the condenser is opened, and the brush 19, which bridges the rings 22 and 23, connects the condenser 36 with the vibrating winding 15 of the relay 13. This circuit may be traced from the condenser 36, segment 1 of the ring 23, brush 19, ring 22, resistance 34 and the two windings forming the vibrating winding in series to ground. The condenser 36 is thereby discharged through the vibrating winding 15 in a direction so that the armature of the relay 13 is caused to reverse its position, that is, to transfer the circuit extending from the negative terminal of battery 16 to the positive terminal of the battery 17. The battery 17 is now connected by means of the brush 20 upon the passage thereof over segment 2 of the ring 25 with the condenser 35, which is thereupon charged positively with respect to ground. As the brush 20 is passing over segment 3 of the ring 25, the brush 19 is at this instance passing over segment 2 of the ring 23, and since the segment 3 of the ring 25 is an open segment, a discharge circuit is established for the condenser 35 in a manner similar to that described for the condenser 36. The discharge of the condenser 35 through the vibrating winding 15 is in a direction such as to reverse the position of the armature to its original position, or the position shown in the drawing. Thus, as the brushes pass over the respective segments of the sections E and F, the condensers 35 and 36 will be alternately charged and discharged in a manner such as to cause the armature of the relay 13 to vibrate between its two contacts for applying negative and positive battery to the ring 26 of the section G. Each time the armature opens and closes its contact due to the passage of the brush 21 over the segments to which the selecting magnets 29, 30, 31, 32 and 33 of the printer mechanism 28, an energizing circuit is established for the respective selecting magnets, depending of course upon the position of the armature of the relay 13.

The frequency at which the armature vibrates, however, depends only on the number of segments employed and the speed of rotation of the brushes.

Assuming now that a signal of a negative polarity and of sufficient duration is impressed at the opposite end of the cable 10 to cause the current in the main or holding winding 14 at the time the brush 19 is passing from segment 1 of the ring 23 and on to segment 2 of this ring, to be in a direction opposite to the current in the vibrating winding produced by the discharge of the condenser 35 and to be of a strength sufficient to neutralize the effect of the vibrating current thus preventing the armature of the relay 13 from leaving the negative terminal of the battery 16, during the passage of the brush 19 over segment 2. If the received signal diminishes to a small enough value during this time, the armature of the relay 13 will move to the positive contact terminal of the battery 17 when brush 19 passes over segment 3 of the ring 23 owing to the fact that the condenser 36 was charged negatively by the passage of the brush 20 over segment 4 of the ring 25. If the value of the received signal current impulse does not diminish during the time that the brush 19 is passing over segment 2 of the ring 23 or succeeding segments thereof, the armature of the relay 13 will continue to remain in contact with the negative terminals of the battery 17 until such time as the signaling current through the main or holding winding 14 diminishes to a value whereby the current through the vibrating winding 15 predominates, and thereby causes the reversal of the position of the armature. The wave form and magnitude of the current in the vibrating winding 15 of the relay may be controlled by varying the value of the resistance 34 and the capacities of the condensers 35 and 36. Also if it is desired to reduce the rate at which current rises in the vibrating winding 15, a condenser of the proper value may be shunted about the winding.

From the previous description it is apparent that the present invention provides an arrangement wherein the vibrations of the receiving relay will be in synchronism with the transmitting mechanism inasmuch as the receiving distributor controls the charging and discharging of the respective condensers, and it is maintained in synchronism with the distributor at the distant end of the cable 10.

Each time that the armature of the relay 13 engages one or the other of its associated contacts, and upon the passage of the brush 21 over the segments of the ring 27 of the section G of the distributor, a circuit is established for the selecting magnets of the receiving printer, which will respond depending upon the polarity of the battery applied to its corresponding segment. Thus if the current in the main or holding winding 14 is of a value too low to prevent the vibration of the armature of the relay 13, each of the selecting magnets will be energized in accordance with the polarity of the battery with which the armature is in engagement at the instant the brush 21 is passing over the segments of ring 27 to which the selecting magnets are connected.

Figure 2:
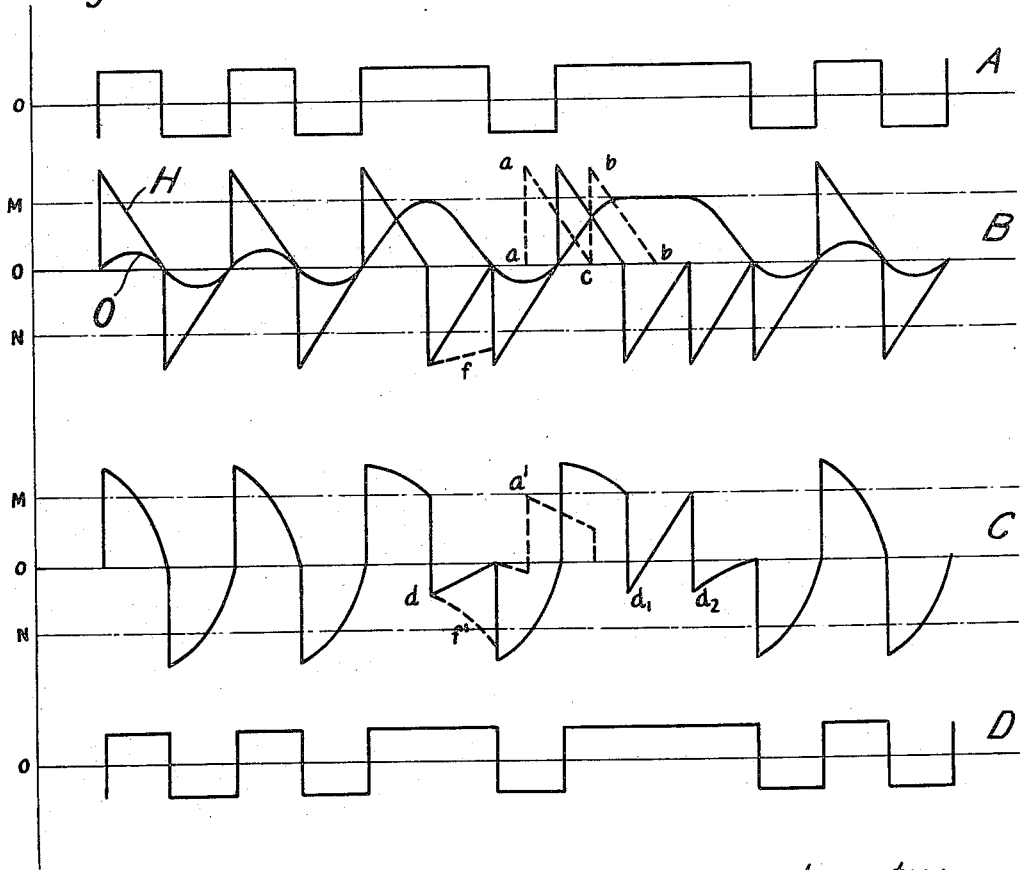
Fig. 2 shows curves representing the currents in the various circuits of the arrangement shown in Fig. 1.

In Fig. 2 there is shown a series of curves representing the characteristics of the currents in the various circuits of the arrangement shown in Fig. 1, and which illustrate the proper wave shape and phase relation of the vibrating and holding currents necessary to produce satisfactory operation of the relay arrangement described in connection with the previously mentioned figure.

In this figure A represents the current impulses impressed upon the line at the distant station, the set of curves B represents the currents in the main and vibrating windings of the receiving relay, curve C represents the effect of the set of curves B in energizing the line relay at the receiving station, and curve D represents the signals as relayed to the recording instrument. The dotted lines of curve C shows the effect upon the energization of the relay which would be caused by a change in wave form or phase displacement of the vibrating windings as represented by the dotted lines in the set of curves B, and the broken lines M and N represent respectively the minimum value of positive and negative current necessary to operate the relay.

Assuming now that the shaping network at the receiving end of the cable is such as to produce signals of the shape shown at O, and the current in the vibrating winding is as shown at H in the set of curves B of Fig. 2, then the total current acting upon the relay to produce operation thereof will be the algebraic sum of those two currents, which is illustrated by the curve C. The relay operated by this current will repeat into the local receiving circuit signals exactly the same as originally transmitted, as are represented by the curve A. If, however, the wave shape of the vibrating current H should be altered to the form shown at $f$, the addition to it of the line current would cause the effective current acting upon the relay to increase, as shown at $d$ of curve C, instead of falling off as was originally the case. The relay would thereupon operate at the instant the current reaches the value $f'$ somewhat earlier than it otherwise would, and the signal which was being repeated in the local circuit would be considerably shortened thereby, while the succeeding impulse would consequently be lengthened. If the vibrating current were made to rise as in the case of the Gulstad relay, instead of falling off, as previously referred to, this distortion would become more objectionable, and operation of the relay would be impossible. If the phase of the vibrating current with respect to the holding current should be shifted so that a reversal of the former occurs at $a$, the effect would be to reduce the value of the operating current to that shown at $a'$, which is so little in excess of the minimum value of the positive impulse required to operate the relay, that unsatisfactory operation would result. Again if the phase of the vibrating current should be shifted in a direction opposite to that just described, the same effect would be obtained. However, if the received signal current impulses were of different shape than shown, it would also be necessary to alter the shape of the vibrating current. The best wave shape can be easily determined by determining the characteristic of the relayed signal while the adjustment of the condensers 35 and 36 and the resistance is being made. The proper phase relation of the respective signal may be obtained by orienting the brushes of the distributor which control the connection of the condensers with the vibrating winding 15 of the relay.

When the relay arrangement responds to a long signal resulting from the transmission of a series of impulses of the same polarity, the algebraic sum of the curves H and O as shown at $d_2$ reaches a value almost sufficient to cause the relay to reverse the position of its armature at a time when no reversal should take place. No change which it is possible to make in the shape of either the vibrating or holding current will overcome this condition without introducing other equally undesirable conditions. However, by using only a portion of the received signal, as will be hereinafter described, the current in the holding winding will be nearly square-topped as shown in the shaded portions of B of Fig. 4. With the arrangement described in connection with Fig. 1, a signal relayed to the receiving printer will be similar to the curve D of Fig. 2, and which is similar to the transmitted signal current wave as shown in A of this figure.

Figure 3:
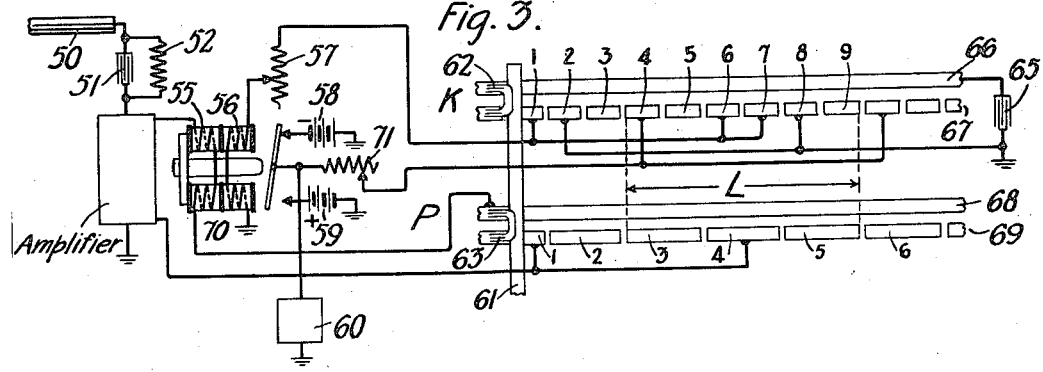
Fig. 3 shows a modification of the arrangement disclosed in Fig. 1.

In Fig. 3 there is shown an arrangement whereby only a portion of the received signal is utilized for effecting the operation of the receiving instrument. In this arrangement, like the one described in connection with Fig. 1, the cable 50 has in series therewith a receiving condenser 51 shunted by a resistance 52, or other distortion correcting network, but the output circuit of the amplifier is connected in series with the main or holding winding 55 of the relay 70, the connection of which is controlled by brush 63 of the receiving distributor. With the arrangement illustrated in this figure, the receiving distributor is provided with two sections, K and P. The former comprises a continuous ring 66 and a segmented ring 67, which controls the charging and discharging of a condenser 65. The section P comprises a continuous ring 68 and a segmented ring 69, certain segments of which are connected with the holding winding 55 of the relay 70, thereby controlling the connection of this winding in circuit with the cable 50. The ring 67 of the section K has the segments thereof so arranged that the length of each segment is one-sixth of the length L of a sending segment of the distributor at the distant end of the cable. The length of the segment of ring 69 is equal to one-third the length of the sending segment. Only the center segment of each group of three segments of the section P is connected to the holding winding 55 of the vibrating relay 70, thus causing the cable to be connected to the vibrating relay during only one-third of a complete signal interval, whereby only a portion of the received signal will be effective on the main line winding. The connections to each group of such segments in the section K are such that as the brush 62 passes over the first or No. 4 segment, the condenser 65 is charged. The second segment, No. 5, is opened, the third and fourth segments, 6 and 7, which correspond in position to the center or live segment of each group in the section P cause the condenser 65 to discharge through the vibrating winding 56 of the vibrating relay 70 in a manner similar to that described in connection with Fig. 1, but which will be simultaneous with the association of the winding 55 with the cable 50. The fifth segment, No. 8, upon the passage of the brush 62 thereover, short circuits the condenser 65 and reduces the residual charge therein to zero. Thus at the instant the brush 62 passes on to segments Nos. 6 and 7, it thereby causes the condenser 65 to discharge through the vibrating winding 56 of the vibrating relay 70. The simultaneous passage of the brush 63 on to segment No. 4 of the ring 69 causes the output circuit of the amplifier to be connected to the holding winding 55, and if the current in the latter winding is of the required value and opposite in direction to the vibrating current during the time the brush 62 is passing over the corresponding segment, the reversal of the armature of the relay, which would otherwise occur at that time, will be prevented and cannot occur until the corresponding time in the next signaling interval. This reversal will then occur only in case the current in the main or holding winding 55 is too low to predominate the effect of the current in the vibrating winding 56.

In order to simplify the arrangement, the recorder 60 is shown permanently connected to the armature of the vibrating relay.

The wave shape and amplitude of the vibrating current may be adjusted as desired by varying the resistances 57 and 71 and the capacity of the condenser 65.

Figure 4:
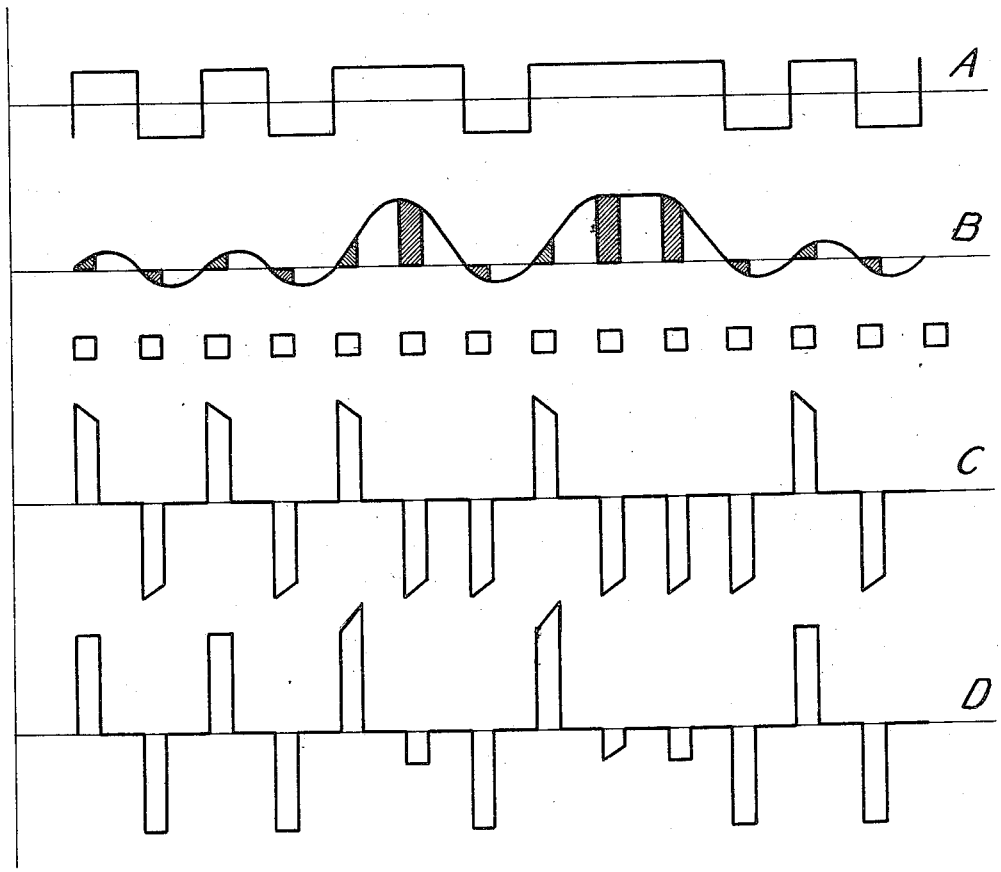
Fig. 4 illustrates the shape of the current waves in the circuits of Fig. 3.

In Fig. 4 the curves A, B, C and D represent the currents utilized in an arrangement of the character disclosed in Fig. 3. Curve A represents signals as transmitted from the distant end of the cable 50, the curve B represents the received signals, the shaded portions of which represent the part of the signal which is caused to act on the holding or main line winding 55 of the vibrating relay 70. Curve C represents the current in the vibrating winding 56 as selected by the arrangement of the segments of the distributor as previously described, while D represents the algebraic sum of the current shown in C and the shaded portions of B. When the current in the vibrating winding is approximately square-topped, the current acting upon the relay to operate it will also approximate square-topped pulses, and those pulses occurring during the intervals when the relay armature remains in contact with either of its opposing contacts, will be much smaller in value than in the method utilizing all of the received signal. It should be noted that due to the fact that the line or cable is disconnected from the receiving apparatus during two-thirds of each signal period, the receiver will not be affected by disturbances occurring during that time, and the number of errors from this source will therefore be materially reduced. The rectangles appearing just below the cross-sectioned part of the curve B represent the segments of the distributor section K which receive only a portion of the received signal current wave, thus relaying into the receiving or local circuit a signal wave substantially like the one disclosed at A of Fig. 4.

It is apparent from the previous description that the present invention provides a system in which, due to the attenuation of the cable, signals of a frequency equal to or greater than the dot frequency will have no appreciable effect on the receiving relay, but signals representing such signals will be repeated or relayed into the local circuit since the relay armature is caused to vibrate in synchronism with the transmitting and receiving synchronous distributors. However, when signals of a lower frequency are received, the current in the main line winding predominates the current in the vibrating winding and prevents the vibration of the armature until such time as the current in the main line winding has changed sufficiently so that it no longer predominates.

What is claimed is:

1. In a telegraph system, the combination of an incoming transmission line, and a relay comprising a line winding, an armature, current supply contacts cooperating therewith, a local circuit winding arranged to produce a magnetic effect on said armature sufficient to cause the movement thereof, current supply means for said local circuit winding, and synchronously operated means for rendering said current supply means and said local circuit winding effective in an invariable phase relation with the transmitted signals for causing the reversal of said armature.

2. In combination with a telegraph system, a receiving relay comprising a line winding, an armature, current supply contacts co-operating therewith, a local circuit winding arranged to produce a magnetic effect on said armature sufficient to cause the movement thereof, electrostatic means serving upon the discharge thereof to supply current to said local circuit winding, and means synchronously operated in an invariable phase relation with the transmitted signals for permitting the discharge of said electrostatic means through said local circuit winding.

3. In a telegraph system, the combination of an incoming transmission line and a relay comprising a line winding, an armature current supply contacts cooperating therewith, a local circuit winding arranged to produce a magnetic effect on said armature sufficient to cause the movement thereof, means serving to supply current to said local circuit winding, and a syuchrononous rotary distributor for rendering said means effective on said local circuit winding.

4. In combination with a telegraph system, a receiving relay comprising a line winding, an armature, current supply contacts cooperating therewith, a local circuit winding arranged to produce a magnetic effect on said armature sufficient to cause the movement thereof, current supply means for said local circuit winding, synchronously operated means for rendering said current supply means and said local circuit winding effective in an invariable phase relation with the transmitted signals for causing the reversal of said armature, and recording means responsive to the reversal of the armature of said relay.

5. In combination with a telegraph system, a receiving relay comprising a line winding, an armature, current supply contacts cooperating therewith, local circuit electromagnetic means arranged to produce a magnetic effect on said armature sufficient to cause the movement thereof, a condenser serving upon the discharge thereof to energize said local circuit electromagnetic means, a synchronous rotary distributor for controlling the charging of said condenser and the completion of a discharge circuit therefor including said local circuit electromagnetic means.

6. In combination with a telegraph system, a receiving relay comprising a line winding, an armature, current supply contacts cooperating therewith, a local circuit winding arranged to produce a magnetic effect on said armature sufficient to cause the reversal thereof, means serving to supply current to said local circuit winding, and a synchronously operated rotary distributor for rendering said means and said local circuit winding effective on said armature during only a portion of the total signal interval.

7. In combination with a telegraph system, a relay comprising a line winding, an armature, current supply contacts cooperating therewith, a local circuit winding arranged to produce a magnetic effect on said armature sufficient to cause the reversal thereof, a condenser serving upon the discharge thereof to supply current to said local circuit winding, and synchronously operated means for establishing a discharge circuit for said condenser extending through said local circuit winding during only the central portion of the total signal interval.

8. In a telegraph system, the combination of an incoming transmission line and a relay comprising a line winding, an armature, current supply contacts cooperating therewith, a local circuit winding arranged to produce a magnetic effect on said armature sufficient to cause the reversal thereof, a condenser serving upon the discharge thereof to supply current to said local circuit winding, and a synchronous rotary distributor having the segments thereof so connected that a discharge circuit for said condenser is established through said local circuit winding during only a portion of the total signal interval whereby the central portion of the signal wave is relayed into the local circuit.

9. A polarized relay comprising a movable armature, opposing contacts therefor, main circuit electromagnetic means arranged to influence said armature, local circuit electromagnetic means also arranged to influence the movement of said armature, current supply means for said local circuit electromagnetic means, and means synchronous with the transmitted signals but independent of said armature for establishing an operative connection between said current supply means and said local circuit electromagnetic means for effecting the reversal of said armature.

10. A polarized relay comprising a movable armature, opposing contacts therefor, main circuit electromagnetic means arranged to influence said armature, local circuit electromagnetic means also arranged to influence the movement of said armature, a condenser for supplying current to said local circuit electromagnetic means, and means synchronous with the impulses received over the main circuit and independent of said armature for establishing a discharge circuit for said condenser through said local circuit electromagnetic means whereby said armature is caused to reverse its position upon a diminution of the current in the main circuit electromagnetic means.

11. The method of signaling over cables in which signals of dot frequency are so attenuated as to practically disappear at the receiving station, which method consists in supplying to the vibrating winding of the receiving line relay local impulses which are in synchronism with the distant transmitter, and altering the sequence of such vibrating impulses by means of signals received over the line which are too small to directly produce operation of the receiving relay.

12. In a telegraph system, the combination of a transmission line, a receiving relay comprising an armature, opposing contacts therefor, main circuit electromagnetic means arranged to influence the movement of said armature, local circuit electromagnetic means likewise arranged to influence the movement of said armature, synchronously operated means for associating said main circuit electromagnetic means with said line during only a portion of the total signal interval and current supply means rendered effective on said local circuit electromagnetic means simultaneously with the association of said main circuit electromagnetic means with said line.

13. In combination with a line circuit, a signal receiving relay, a local circuit controlled thereby, a local interrupter for supplying periodic impulses in an invariable order to said relay, and circuit connections whereby the signal impulses received over said line circuit are caused to aid or oppose said periodic impulses and thereby to give corresponding signal indications in said local circuit.

14. In combination with a line circuit, a signal receiving relay, a local circuit controlled thereby, a local interrupter for supplying periodic impulses in an invariable order to said relay and thereby to cause the vibration of the armature thereof, and circuit connections whereby signal impulses received over said line circuit are caused to aid or oppose said periodic impulses and thereby to give corresponding signal indications in said local circuit.

15. In combination with a line circuit, a signal receiving relay, a local circuit controlled thereby, a rotary distributor for supplying periodic impulses to said relay, and circuit connections whereby signal impulses received over said line circuit are caused to aid or oppose said periodic impulses and thereby to give corresponding signal indications in said local circuit.

16. In combination with a line circuit, a signal receiving relay, a local circuit controlled thereby, a continuously rotating distributor for supplying periodic impulses to said relay, and circuit connections whereby signal impulses received over said line circuit are caused to aid or oppose said periodic impulses and thereby to give corresponding signal indications in said local circuit.

In witness whereof, I hereunto subscribe my name this 22nd day of November A. D., 1921.

ALLISON A. CLOKEY.